US011195371B2

(12) United States Patent
Purohit et al.

(10) Patent No.: US 11,195,371 B2
(45) Date of Patent: Dec. 7, 2021

(54) PREPARATION AND INSTALLATION OF GAMING DEVICES USING BLOCKCHAIN

(71) Applicant: Aristocrat Technologies, Inc., Las Vegas, NV (US)

(72) Inventors: Nimish Purohit, Las Vegas, NV (US); Garrett Hill, Las Vegas, NV (US); Eric Taylor, Carson City, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

(21) Appl. No.: 16/902,186

(22) Filed: Jun. 15, 2020

(65) Prior Publication Data

US 2021/0174634 A1 Jun. 10, 2021

Related U.S. Application Data

(60) Provisional application No. 62/943,463, filed on Dec. 4, 2019.

(51) Int. Cl.
*G07F 17/32* (2006.01)
*H04L 9/32* (2006.01)
*H04L 9/06* (2006.01)
*G06F 8/61* (2018.01)

(52) U.S. Cl.
CPC ............ *G07F 17/3227* (2013.01); *G06F 8/61* (2013.01); *G07F 17/3241* (2013.01); *H04L 9/0637* (2013.01); *H04L 9/3247* (2013.01); *H04L 2209/38* (2013.01)

(58) Field of Classification Search
None
See application file for complete search history.

(56) References Cited

U.S. PATENT DOCUMENTS

| 8,449,378 | B2 | 5/2013 | Michaelson |
| 10,223,679 | B2 | 3/2019 | Lee |
| 10,297,106 | B1 | 5/2019 | Simons |
| 10,425,426 | B1 | 9/2019 | Simons |

(Continued)

FOREIGN PATENT DOCUMENTS

| GB | 2573622 A | 11/2019 |
| WO | 2019089774 A1 | 5/2019 |
| WO | 2019089778 A1 | 5/2019 |

*Primary Examiner* — Ronald Laneau
(74) *Attorney, Agent, or Firm* — Armstrong Teasdale LLP

(57) ABSTRACT

A blockchain system for facilitating preparation and installation of electronic gaming devices using a blockchain network is provided. The blockchain system includes an electronic gaming machine (EGM). The EGM includes a memory, a network interface, and at least one processor. The processor is configured to execute the operating system and the blockchain client, initiate a software installation on the EGM of a software component after the EGM has been delivered to an operational venue, including transmitting a software request transaction into the blockchain network for addition to the blockchain, identify a software permission blockchain transaction from the blockchain authorizing the installation of the software component on the EGM, download the software component from a cloud server of a regulated cloud storing certified software images of software components for EGMs in the blockchain network, and install the software component on the EGM.

20 Claims, 7 Drawing Sheets

(56) References Cited

U.S. PATENT DOCUMENTS

| | | | |
|---|---|---|---|
| 10,530,569 B2 | 1/2020 | Bisti | |
| 10,549,202 B2 | 2/2020 | McCoy | |
| 10,741,017 B2 | 8/2020 | Silva | |
| 10,949,417 B2 * | 3/2021 | Kurian | G06F 16/2379 |
| 11,023,981 B2 * | 6/2021 | Hu | G06F 16/245 |
| 2008/0235746 A1 * | 9/2008 | Peters | H04N 21/4351 |
| | | | 725/111 |
| 2017/0161991 A1 | 6/2017 | Ayati | |
| 2017/0287593 A1 | 10/2017 | Ovalle | |
| 2018/0096175 A1 * | 4/2018 | Schmeling | G06Q 10/08 |
| 2018/0096752 A1 | 4/2018 | Ovalle | |
| 2018/0114403 A1 | 4/2018 | Jayachandran | |
| 2019/0028264 A1 | 1/2019 | Bisti | |
| 2019/0028265 A1 | 1/2019 | Bisti | |
| 2019/0096191 A1 | 3/2019 | Stuehling | |
| 2019/0122300 A1 | 4/2019 | O'Brien | |
| 2019/0122495 A1 | 4/2019 | Yi | |
| 2019/0130698 A1 | 5/2019 | Simons | |
| 2019/0130701 A1 | 5/2019 | Simons | |
| 2019/0143207 A1 | 5/2019 | Kumar | |
| 2019/0221076 A1 | 7/2019 | Simons | |
| 2019/0280875 A1 | 9/2019 | Ragnoni | |
| 2019/0295371 A1 | 9/2019 | Simons | |
| 2019/0314726 A1 | 10/2019 | Masini | |
| 2019/0325700 A1 | 10/2019 | Jayachandran | |
| 2019/0333285 A1 | 10/2019 | Delia | |
| 2019/0373015 A1 | 12/2019 | Kozloski | |
| 2020/0021600 A1 | 1/2020 | Simons | |
| 2020/0027315 A1 | 1/2020 | Cotton | |
| 2020/0051368 A1 | 2/2020 | Pustizzi | |
| 2020/0110855 A1 * | 4/2020 | Cunningham | H04L 9/0643 |

* cited by examiner

PREPARATION AND INSTALLATION OF GAMING DEVICES USING BLOCKCHAIN

CROSS-REFERENCE TO RELATED APPLICATION

This patent application claims the benefit priority of U.S. Provisional Patent Application Ser. No. 62/943,463, filed Dec. 4, 2019, entitled PREPARATION AND INSTALLATION OF GAMING DEVICES USING BLOCKCHAIN, the entire contents and disclosure of which is hereby incorporated by reference in its entirety.

Additionally, this patent application is related to U.S. patent application Ser. No. 16/837,655, filed Apr. 1, 2020, entitled TICKETING SYSTEMS ON A DISTRIBUTED LEDGER, to U.S. patent application Ser. No. 16/841,957, filed Apr. 7, 2020, entitled PROGRESSIVE SYSTEMS ON A DISTRIBUTED LEDGER, and to U.S. patent application Ser. No. 16/864,800, filed May 1, 2020, entitled SECURELY STORING MACHINE DATA ON A NON-VOLATILE MEMORY DEVICE.

TECHNICAL FIELD

The field of disclosure relates generally to electronic gaming, and more particularly to electronic gaming systems and methods for providing shipment ready gaming devices using blockchain technology.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player via a printed "ticket" upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Various jurisdictions proscribe regulations surrounding how EGMs are designed, shipped, configured, and maintained. Due to various chain of trust concerns, shipment and configuration of EGMs are often regulated to protect from various potential security exploits. For example, one common regulatory provision in some jurisdictions requires that EGMs and their associated software (e.g., operating system, game software, and such) be transported in separate shipments and be delivered to their operational venues (e.g., casino properties) on two different occasions, thus effectively prohibiting the shipment of operational EGMs. One of the underlying concerns was that the software could be tampered with during shipment and then placed into service when the EGMs arrived. However, this restriction on "fully assembled" EGMs causes numerous problems, such as shipping coordination or delays waiting on both the hardware and the software to arrive on site, on-site work and scheduling requirements to have a technician install/configure the EGM, greater expertise requirements of the technician to understand how to install/configure software on the EGM, and various increased costs for this conventional paradigm. Further, the software packages may also be required to transit through multiple parties, such as from the game manufacturer to regulators and then to operators. As such, the shipment, approval, receipt, and installation of the software package typically takes from 10 to 30 days.

Another common regulation prohibits single shipments of multiple gaming machines to multiple destinations. This "single destination" requirement for shipments of EGMs was originally intended to help ensure integrity of the EGM in transit and ensure that the proper EGMs were delivered to the right location. However, this restriction adds considerable costs and delays as shippers must then send multiple, separate shipments, one for each location. This inefficiency also increases waste and environmental impact through fuel emissions, higher shipping costs, longer driving times, heavier truck and trailer utilization, and more complicated administrative coordination.

Yet another common regulation requires that gaming equipment suppliers provide regulators with written notice before EGMs and software may be shipped. This "shipment notice" requirement typically includes a notice period of many days or weeks before hardware and software can be shipped. Longer notice may be proscribed for destinations that are remote or that do not have on-site agents. Such regulatory notice is typically required to ensure that regulators have a timely inventory of gaming machines in the jurisdiction and, in jurisdictions that require gaming agents to be present upon delivery at distant venues, to allow the scheduling of agent travel to the venue.

What is needed is a system and method for preparing EGMs for shipment and for installing and configuring EGMs at operational venues that mitigates problems with existing systems to the satisfaction of operators and regulators while improving security and time to market of the devices.

BRIEF SUMMARY

In one aspect, a blockchain system for facilitating preparation and installation of electronic gaming devices using a blockchain network is provided. The blockchain system includes an electronic gaming machine (EGM) configured to participate in the blockchain network. The EGM includes a memory storing an operating system (OS), a blockchain client, a blockchain and a machine unique identifier (UID). The EGM also includes a network interface configured to allow networked communication between the EGM and other participating nodes in the blockchain network. The EGM further includes at least one processor configured to execute instructions. When executed, the instructions cause the at least one processor to execute the operating system and the blockchain client. The blockchain client participates in the blockchain network with the other participating nodes. The other participating nodes include a cloud server of a regulated cloud storing certified software images of software components for EGMs in the blockchain network. The instructions also cause the at least one processor to initiate a software installation on the EGM of a software component after the EGM has been delivered to an operational venue. The initiation includes transmitting a software request transaction into the blockchain network for addition to the blockchain. The instructions further cause the at least one processor to identify a software permission blockchain transaction from the blockchain. The software permission blockchain transaction authorizes the installation of the software component on the EGM. The instructions also cause the at least one processor to download the software component from a cloud server of a regulated cloud storing certified software images of software components for EGMs in the blockchain network. The instructions further cause the at least one processor to install the software component on the EGM.

In another aspect, a blockchain system for facilitating preparation and installation of electronic gaming devices using a blockchain network is provided. The blockchain system includes an electronic gaming machine (EGM) configured to participate in the blockchain network. The EGM includes a memory storing an operating system (OS), a blockchain client, a blockchain and a machine unique identifier (UID). The EGM also includes a network interface configured to allow networked communication between the EGM and other participating nodes in the blockchain network. The EGM further includes at least one processor configured to execute instructions. When executed, the instructions cause the at least one processor to execute the operating system and the blockchain client prior to shipment of the EGM to an operational venue. The blockchain client participates in a blockchain network with the other participating nodes prior to shipment of the EGM. The other participating nodes include a cloud server of a regulated cloud storing certified software images of software components for EGMs in the blockchain network. The instructions also cause the at least one processor to transmit an EGM preparation blockchain transaction into the blockchain network for addition to the blockchain prior to shipment of the EGM to the operational venue. The EGM preparation blockchain transaction includes the machine UID. The instructions further cause the at least one processor to initiate a software installation on the EGM of a software component after the EGM has been delivered to the operational venue. The initiation includes transmitting a software request transaction into the blockchain network for addition to the blockchain. The instructions also cause the at least one processor to identify a software permission blockchain transaction from the blockchain. The software permission blockchain transaction authorizes the installation of the software component on the EGM. The instructions also cause the at least one processor to download the software component from the cloud server. The instructions further cause the at least one processor to install the software component on the EGM.

In yet another aspect, an electronic gaming machine (EGM) is provided. The EGM is configured to participate in a blockchain network. The EGM includes a memory storing an operating system (OS), a blockchain client, a blockchain and a machine unique identifier (UID). The EGM also includes a network interface configured to allow networked communication between the EGM and other participating nodes in the blockchain network. The EGM further includes at least one processor configured to execute instructions. When executed, the instructions cause the at least one processor to execute the operating system and the blockchain client prior to shipment of the EGM to an operational venue. The blockchain client participates in a blockchain network with the other participating nodes prior to shipment of the EGM. The other participating nodes include a cloud server of a regulated cloud storing certified software images of software components for EGMs in the blockchain network. The instructions also cause the at least one processor to transmit an EGM preparation blockchain transaction into the blockchain network for addition to the blockchain prior to shipment of the EGM to the operational venue. The EGM preparation blockchain transaction includes the machine UID. The instructions further cause the at least one processor to initiate a software installation on the EGM of a software component after the EGM has been delivered to the operational venue. The initiation includes transmitting a software request transaction into the blockchain network for addition to the blockchain. The instructions also cause the at least one processor to identify a software permission blockchain transaction from the blockchain. The software permission blockchain transaction authorizes the installation of the software component on the EGM. The instructions also cause the at least one processor to download the software component from the cloud server. The instructions further cause the at least one processor to install the software component on the EGM.

In still another aspect, a method of facilitating preparation and installation of electronic gaming devices using a blockchain network is provided. The method includes executing the operating system and the blockchain client prior to shipment of an EGM to an operational venue. The blockchain client participates in a blockchain network with the other participating nodes prior to shipment of the EGM. The other participating nodes include a cloud server of a regulated cloud storing certified software images of software components for EGMs in the blockchain network. The method also includes transmitting an EGM preparation blockchain transaction into the blockchain network for addition to the blockchain prior to shipment of the EGM to the operational venue. The EGM preparation blockchain transaction includes the machine UID. The method further includes initiating a software installation on the EGM of a software component after the EGM has been delivered to the operational venue. The initiation includes transmitting a software request transaction into the blockchain network for addition to the blockchain. The method also includes identifying a software permission blockchain transaction from the blockchain. The software permission blockchain transaction authorizes the installation of the software component on the EGM. The method further includes downloading the software component from the cloud server. The method also includes installing the software component on the EGM.

BRIEF DESCRIPTION OF THE DRAWINGS

An example embodiment of the subject matter disclosed will now be described with reference to the accompanying drawings.

DETAILED DESCRIPTION

Figure 1:
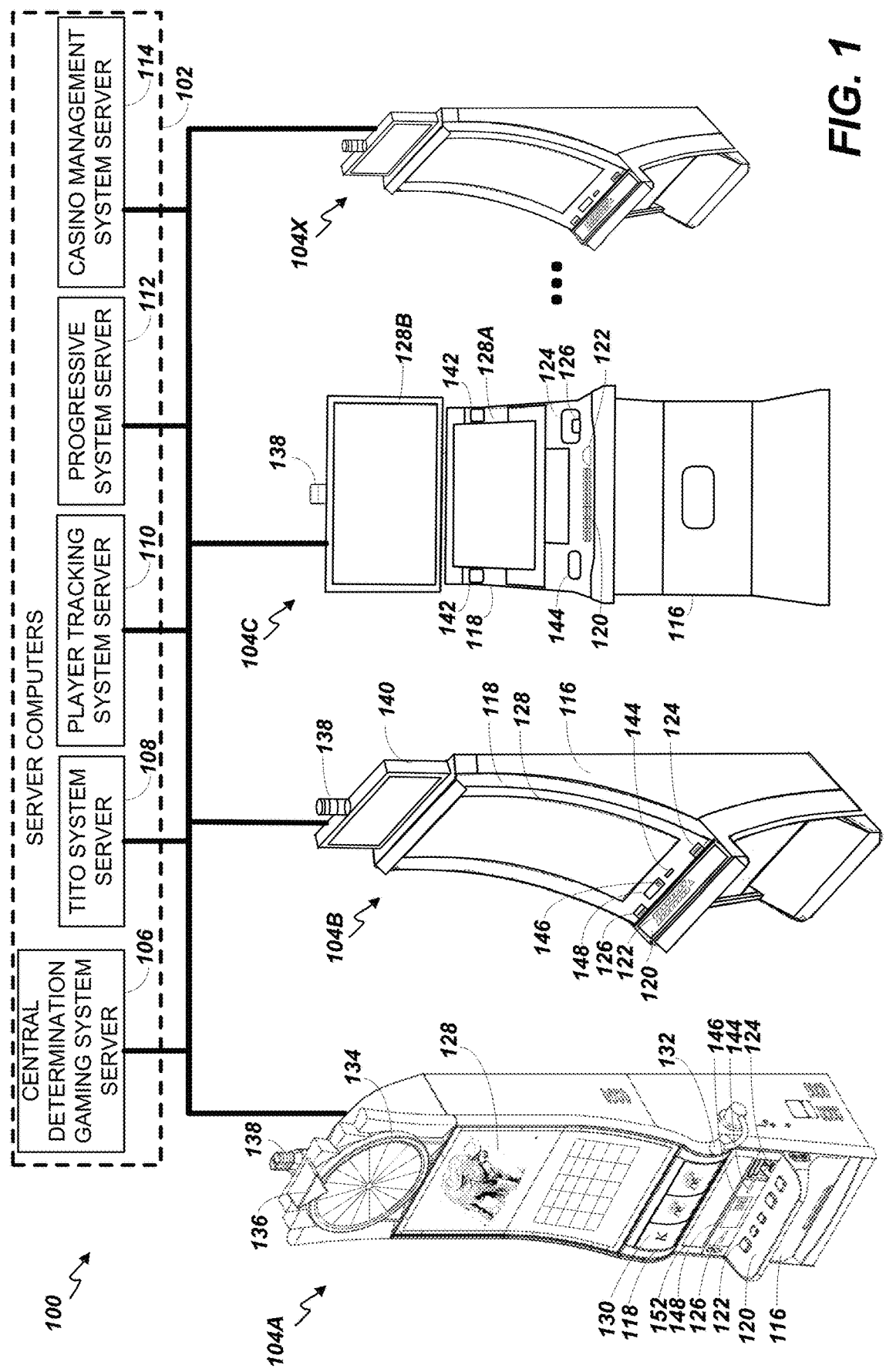
FIG. 1 is a diagram of exemplary EGMs networked with various gaming-related servers.

Typically, software is shipped and installed separately from gaming devices to, for example, allow regulators to test the software prior to installation (e.g., to ensure integrity of the software prior to installation and use on gaming devices). Such restrictions cause various problems, including delayed time to market between when an EGM is purchased and when that EGM is installed and operational. Some of these regulatory processes were designed when EGMs were using EPROM chips, where current gaming technology typically uses software installed on storage devices. Further, these decades-old conventional methods may be less secure than what is possible with current technology.

An EGM distribution system and methods are described herein that utilize aspects of blockchain technology to facilitate shipment preparation and on-site installation of EGMs. In an example embodiment, a preparation administrator at the preparation site prepares EGMs for shipment by installing an operating system and a blockchain client on internal storage. The EGM is configured to participate in a blockchain ("configuration blockchain") that is used to authenticate and manage aspects of setup and configuration operations (e.g., platform and game installations) for the EGM and other devices. A regulated cloud storage environment stores various approved electronic game software, platform software, and other software components ("golden image" software packages) which may be downloaded and installed onto the EGMs once the devices are physically delivered to an operational venue (e.g., casino property or other gaming location). The cloud storage environment also includes a cloud server that participates in the configuration blockchain and can transmit golden image software components to the EGMs during configuration at the operational venue.

During preparation, a ledger transaction ("preparation transaction") is added to the configuration blockchain before the EGM is shipped (e.g., by the EGM, or by a preparation administration device participating in the blockchain). The preparation transaction serves as a first step in preparing the EGM for installation at the operational venue, memorializing various device-specific data into the configuration blockchain such as EGM serial number, EGM manufacturer, and other device-specific information. In addition, a security key is also configured for the EGM and is shipped separately from the EGM (e.g., to regulators or direct to operators). The security key is one of multiple factors of authentication used to enable download and installation of golden image software from the regulated cloud.

During installation, the EGM submits an installation transaction into the blockchain. The configuration blockchain includes a smart contract ("installation authentication smart contract") that triggers upon entry of the installation transaction. The installation authentication smart contract performs authentication on the EGM using the information from the preparation transaction and the HASP key as two-factor authentication. Once the EGM has been authenticated, the download and installation of the authorized golden image software packages are performed from the regulated cloud. As such, the use of blockchain and smart contracts facilitates allowing EGMs to be shipped with its storage device already installed, and software installation to be authenticated and performed from a regulated cloud that has authentic golden images.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a web site maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
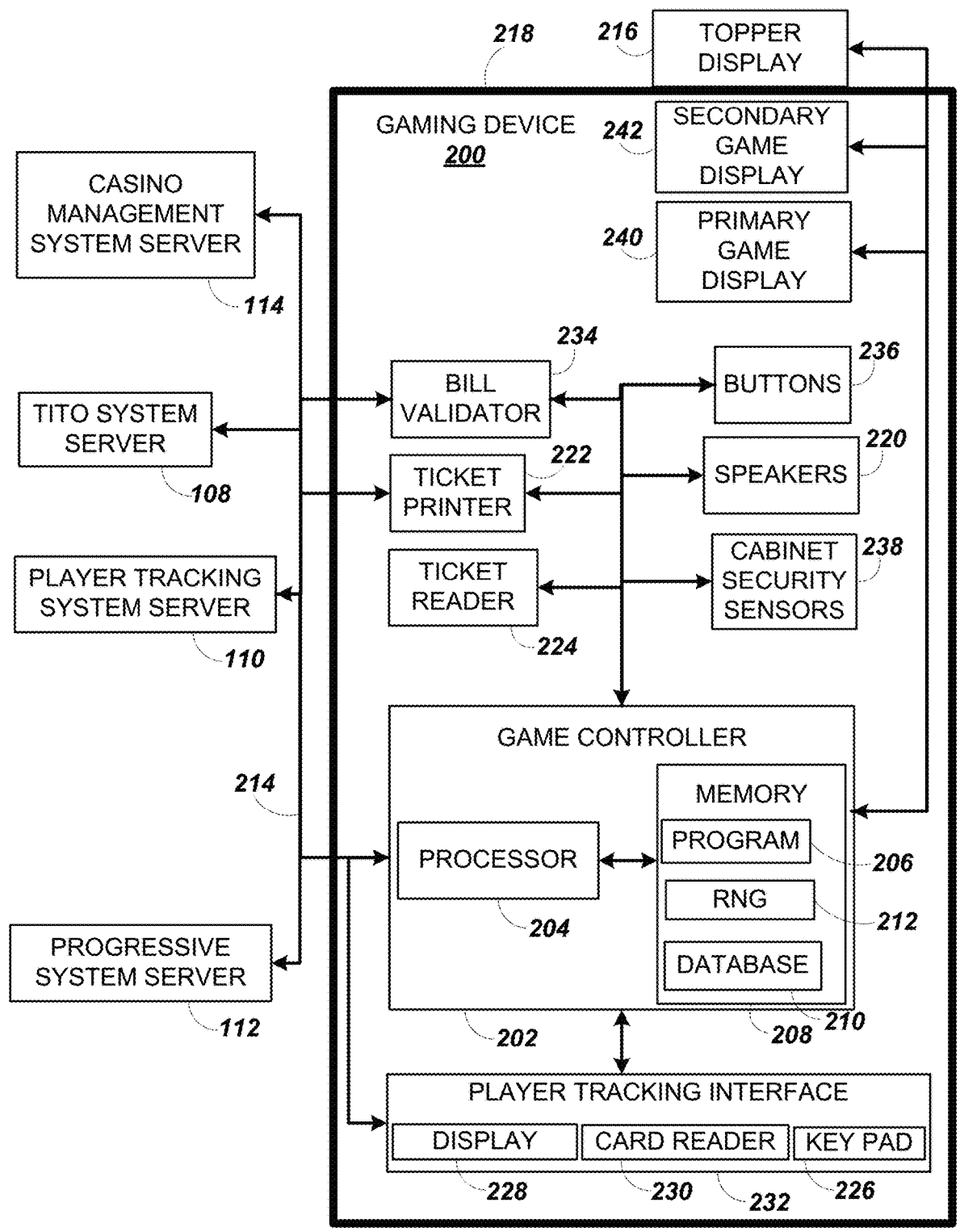
FIG. 2 is a block diagram of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204. Note that embodiments of the present disclosure represent an improvement in the art of EGM software and provide a technological improvement in the field of EGM technology in that the EGM blockchain technology described herein utilizes aspects of blockchain technology to facilitate EGM configuration and deployment.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 3:
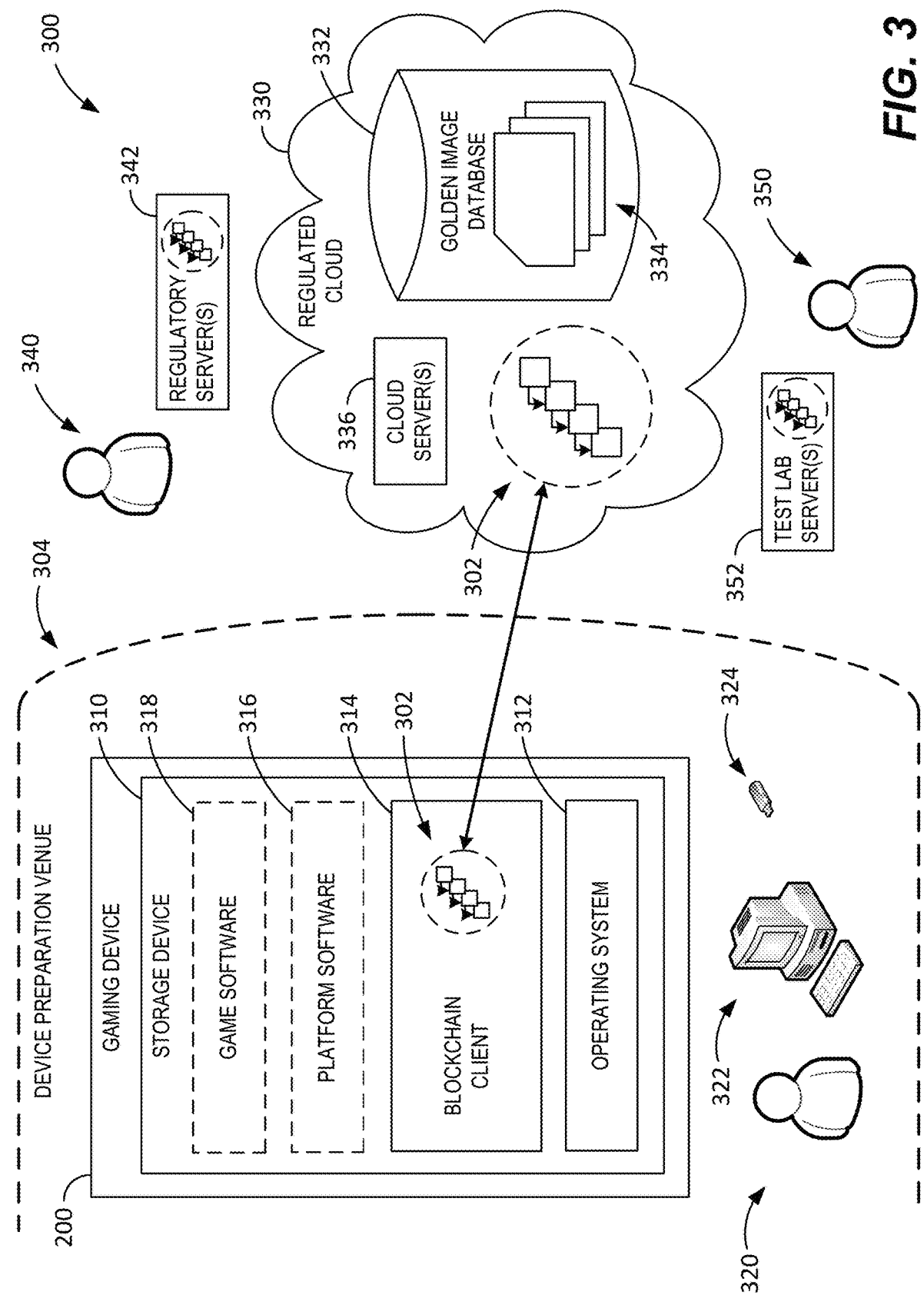
FIG. 3 is a networked environment of an EGM distribution system in which EGMs (e.g., gaming devices) are prepared, shipped, and configured for operation using a configuration blockchain and smart contracts.

FIG. 3 is a networked environment of an EGM distribution system 300 in which EGMs (e.g., gaming devices 200) are prepared, shipped, and configured for operation using a blockchain 302. In the example embodiment, the gaming device 200 is initially prepared at a device preparation venue 304 (e.g., a device manufacturing or physical assembly location) before being transported to an operational venue (e.g., a casino floor or other operator premises, also referred to herein as an "installation venue"). A preparation process is performed on the gaming device 200 before shipping. This preparation process prepares the device and other supporting infrastructure for an installation process that will be performed on the gaming device 200 once the gaming device 200 is at the operational venue.

In the example embodiment, the EGM distribution system 300 includes a regulated cloud storage environment (or just "cloud") 330 that is involved in both the preparation process and in the installation process. The cloud 330 includes a golden image database 332 that serves as a software repository for various approved software components 334 that may get installed on the gaming device 200. These software components 334 may include certified versions of gaming software, platform software, operating system software, or other tools or software components (referred to broadly herein as "approved" or "authorized" components) that may be downloaded and installed onto EGMs such as the gaming device. These software components 334 are typically highly tested, regulated, and tightly controlled versions of the software components and, as such, may be referred to herein as "golden images" (e.g., the particular versions of components that are certified to be installed on gaming devices, typically a combination of platform version identifier and game software version identifier, each having corresponding original hash values). The term "gaming software" is used herein to refer to the computer executables or instructions for providing particular electronic games (e.g., particular game titles) on the EGM, where the term "platform software" is used herein to refer to software tools, middleware, or other software infrastructure that facilitates executing the gaming software on the EGM. For example, in terms of a software stack, platform software executes on underlying OS software, and gaming software executes on the platform software. In a tightly regulated gaming industry, the images of such OS software, platform software, and gaming software installed on EGMs are tightly regulated, controlled, and monitored.

The regulated cloud 330, in the example embodiment, also includes one or more cloud servers 336. These cloud servers 336 participate in the blockchain 302 (e.g., as participating nodes) and, as such, may manage a copy of the blockchain 302, submit transactions into the blockchain 302, add blocks to the blockchain 302, execute smart contracts associated with the blockchain 302, or other such blockchain operations. In addition, the cloud servers 336 may access the golden image database 332 and may be in networked communication with the gaming device 200 (e.g., when at the preparation venue 304, when at the operational venue) to perform authentication operations and support transfer and installation of software components 334 from the golden image database 332 to the gaming device 200 (e.g., file transfer). In some embodiments, the cloud servers 336 may track a number of downloads that occur (e.g., for a particular order, for a particular security key, for a particular customer, or such). If a number of downloads exceeds a pre-determined maximum number of downloads (e.g., for order, security key, customer, or such), further downloads may be restricted.

The gaming device 200 includes a storage device 310, such as an internal hard drive or Compact Fast ("CFast") card, which may be similar to memory 208 (shown in FIG. 2). The storage device 310 is initially configured with two software components during the preparation process, an operating system 312 and a blockchain client 314. The storage device 310 will eventually store various platform software 316 and game software 318 (both shown in broken line in FIG. 3), but in the example embodiment, those software components are installed once the device 200 has been delivered to an operational venue (not shown in FIG. 3).

The blockchain client 314 is configured to participate in the blockchain 302 with various other devices, including cloud servers 336, regulatory servers 342, other gaming devices 200, and test lab servers 352. In the example embodiment, the blockchain 302 stores ledger transactions associated with device preparation, shipping, installation, and configuration. The blockchain 302 is also configured with various smart contracts that are used to automatically perform various actions for the blockchain 302, as described herein.

During shipment preparation, a preparation administrator ("preparation admin") 320 (e.g., a device technician) performs various installation and initial configuration operations on the gaming device 200 prior to shipment. For example, the preparation admin 320 uses a configuration device (e.g., the MFG/DEV server 322 or a desktop or mobile computing device) to prepare the gaming device 200 prior to shipment. The shipment preparation process includes two main components, storage configuration and key configuration.

Storage device configuration, in the example embodiment, includes installing an operating system 312 on the storage device 310. In addition, storage device configuration also includes installing the blockchain client 314 on the storage device 310. Both the operating system 312 and the blockchain client 314 may be golden images stored in the golden image database 332 and may be provided by the cloud servers 336 or other support servers or physical media. In some embodiments, the blockchain client 314 may be provided on a ROM device, a solid state drive, and/or a memory card device (e.g., CFast card). The blockchain client 314 is initially configured to participate in the blockchain 302 and, as such, downloads an updated copy of the blockchain 302 to the storage device 310. Prior to shipment of the gaming device 200, the blockchain 302 is updated with a preparation transaction associated with the gaming device 200. The preparation transaction memorializes the initial stage of installation of this gaming device 200 in the ledger of the blockchain 302 and includes information such as EGM-specific information (e.g., EGM serial number, EGM manufacturer, or other identifying information), initial preparation information (e.g., software component installation, date/time information, technician information, firmware versions, baseline log of tests performed during assembly), and operational information (e.g., operational venue location and geographic information, purchaser information, game and platform component identification).

Security key configuration includes preparing a security key 324 that will be shipped separately from the gaming device 200 (e.g., for regulatory compliance). In one example embodiment, the security key 324 is a HASP ("hardware against software piracy") key in the form of a USB key or other hardware dongle that may be plugged into the gaming device 200 during preparation or installation. The security key 324 is a tool that may be used during configuration of the machine, as a checkpoint after final assembly at the preparation venue 304, thereby allowing a pause in configuration that can be completed by an authorized technician at the destination. In some embodiments, the security key 324 may include encryption and protection mechanisms that allow for the software to be protected during shipment. The security key 324 may include a public key of a public-key cryptography (e.g., asymmetric cryptography) key pair used to digitally sign image hashes and authenticate various software components installed or to be installed on the gaming device 200 (e.g., by a technician at the installation site). In some embodiments, the public key may be used to validate the smart contract (e.g., some or all of the information recorded in the smart contract may be signed before shipment and then confirmed at delivery and installation before closing out the smart contract. In some embodiments, the public key may be delivered via the smart contract or otherwise by the blockchain (e.g., in addition to, or in lieu of being provided on the security key 324). The security key may be shipped to a regulator 340 or directly to an operator (not shown) at the operational venue. In some embodiments, the security key 324 may be configured specific to an operator, to an order number corresponding to a set of gaming devices 200, to a particular date or date window for installation. In some embodiments, the preparation admin 320 may submit blockchain transactions with the MFG/DEV server 322 (e.g., which may act as a participating node in the blockchain 302) and may use the MFG/DEV server 322 to prepare the security key 324. In some embodiments, any or all of the data stored on the security key 324 may be memorialized in the blockchain 302 (e.g., in the preparation transaction) prior to transport of the gaming device 200.

Once the gaming device 200 and security key 324 have been prepared for shipping, the gaming device 200 is transported to the operational venue and the security key 324 is separately sent to either the regulator 340 or to the operator.

In some embodiments, the test lab servers 352 may also participate in the blockchain 302. Test lab administrators 350 perform testing and validation processes on the various software components 334 stored in the golden image database 332 before those components 334 are allowed to be downloaded and installed onto gaming devices 200. Once a test lab administrator 350 has verified that a particular software component 334 in the database 332 is ready to certify for use, the test lab server 352 submits a component verification transaction for addition into the blockchain 302. The component verification transaction includes information such as a software identifier, a version identifier, or other unique identification information identifying a particular software component 334 within the database 332, a hash value generated from the bytes of the software component 334 (e.g., digital signature for later comparison to installed versions), and testing information (e.g., identity of test lab, date/time of certification, jurisdictional scope, and such). The hash value may be used to verify whether any changes have been made to the software package since being evaluated by an independent test lab.

In the example embodiment, regulators 340 inspect and approve gaming device installations in their own jurisdictions (e.g., at operational venues within their geographic areas of influence). Prior to certifying a particular golden image of software components 334 in the database 332, regulators 340 may generate a hash of the software component 334 and compare that hash to a golden image hash provided by the test lab inspector 350 (e.g., to verify that the software component 334 matches the software component tested and certified by the test lab inspector 350). In some embodiments, the regulatory server 342 may participate in the blockchain 302 and regularly inspect the blockchain 302 for new and unprocessed preparation transactions falling within its jurisdiction. Upon detection of the preparation transaction for the gaming device 200, the regulator 340 can evaluate the details of the preparation transaction (e.g., as a request for installation), such as the device identification information, the operational venue into which the gaming device 200 is scheduled to be installed, the scheduled installation time, the software components and versions planned for this gaming device 200, and such. In some embodiments, the blockchain 302 may be configured with a smart contract configured to transmit an alert message to the particular regulator 340 for that gaming device 200 upon initial entry of the preparation transaction. The regulator 340 may inspect the identified software components 334 in the golden image database 332 (e.g., to ensure that those software components 334 have been validated by test lab inspectors 350). In some embodiments, the regulatory server 342 may inspect the blockchain 302 for the presence of component verification transactions for each software component 334 identified for installation. In the example embodiment, the hash value for a particular software component is recreated by regulators on the software packages stored in the cloud. The regulators ensure that each particular software component 334 as stored in the cloud matches the software component tested by the test lab inspectors 350 by hashing the bytes of the software component (e.g., using the same hashing algorithm as the inspectors 350) and comparing that recreated hash value to the original hash value provided by the inspector 350. In some embodiments, the original hash value may be accessed by the regulators 340 directly from the test lab servers 352. Once the regulator 340 is satisfied that the hash values match and the installation should be approved, the regulatory server 342 submits an installation approval transaction into the blockchain 302. The installation approval transaction may include, for example, identification information of the particular preparation transaction that is approved, identification information of the gaming device 200, particular software components 334 approved for installation, operational venue approval information, or such.

Upon arrival at the operational venue, the gaming device 200 is network connected (e.g., to a back-end premise network at the casino) and an installation administrator (e.g., a service technician, an operator, or the like) begins a software installation process to load the platform software 316 and game software 318 on the storage device 310. Upon re-establishing connection between the blockchain client 314 and the blockchain 302, the blockchain client 314 returns to be a participating node in the blockchain 302. Upon initial handshake and post smart contract reconciliation, the blockchain 302 rejects the client orphan block and reconciles the gaming device 200 as a new node in this blockchain 302 (e.g., until the client is taken offline or a RAM clear occurs). The installation process includes authentication of the gaming device 200 with the security key 324 (e.g., plugging the security key 324 into a USB port on the gaming device 200) and two-factor authentication. In some embodiments, authentication of the gaming device 200 includes verifying one or more software components installed on the gaming device 200 using the PKI public key (e.g., provided via the security key 324 or via the blockchain 302) prior to installing additional software components or prior to placing the gaming device 200 into service. In some embodiments, the security key 324 may be configured for a particular EGM (e.g., with a public/private key pair specific to that EGM). In other embodiments, the security key 324 may be configured for a group of EGMs (e.g., with a public/private key pair specific to a group of EGMs, to all EGMs on a particular purchase order). In some embodiments, the security key 324 may be configured for a particular purchaser/operator (e.g., with a public/private key pair specific to the purchaser/operator, where the manufacturer uses the public key of that operator) or for a particular manufacturer/developer (e.g., where the manufacturer shares their public key with the purchaser/operator).

In the example embodiment, the installation process also includes the gaming device 200 submitting one or more installation request transactions into the blockchain 302. Each installation request transaction identifies the gaming device 200 (e.g., with a unique device identifier ("ID"), or "machine UID") or other device identification information, and software component information (e.g., identification information for the software component 334 that is requested for installation). The blockchain 302 includes a smart contract ("installation request contract") that is configured to validate the installation request transaction. More specifically, the installation request contract searches the blockchain 302 for the installation approval transaction associated with the gaming device 200 (e.g., using device identification information) and verifies that the installation for the requested software component(s) has been approved. If the installation request contract verifies that the installation has been approved in the blockchain 302, then the installation request contract submits a download approval transaction into the blockchain 302 identifying the gaming device 200 and the software component(s) 334 approved for download to the gaming device. The cloud server 336 monitors the blockchain 302 for new, unprocessed download approval transactions and, upon detection of a new transaction, the cloud server 336 initiates a push of the associated software components 334 from the golden image database 332 or otherwise permissions the gaming device 200 to initiate a download of those software components 334. In some embodiments, the blockchain 302 is used to identify which software components 334 are to be pushed or authorized for download to the gaming device 200 (e.g., from the installation approval transaction, from the preparation transaction).

Figure 4:
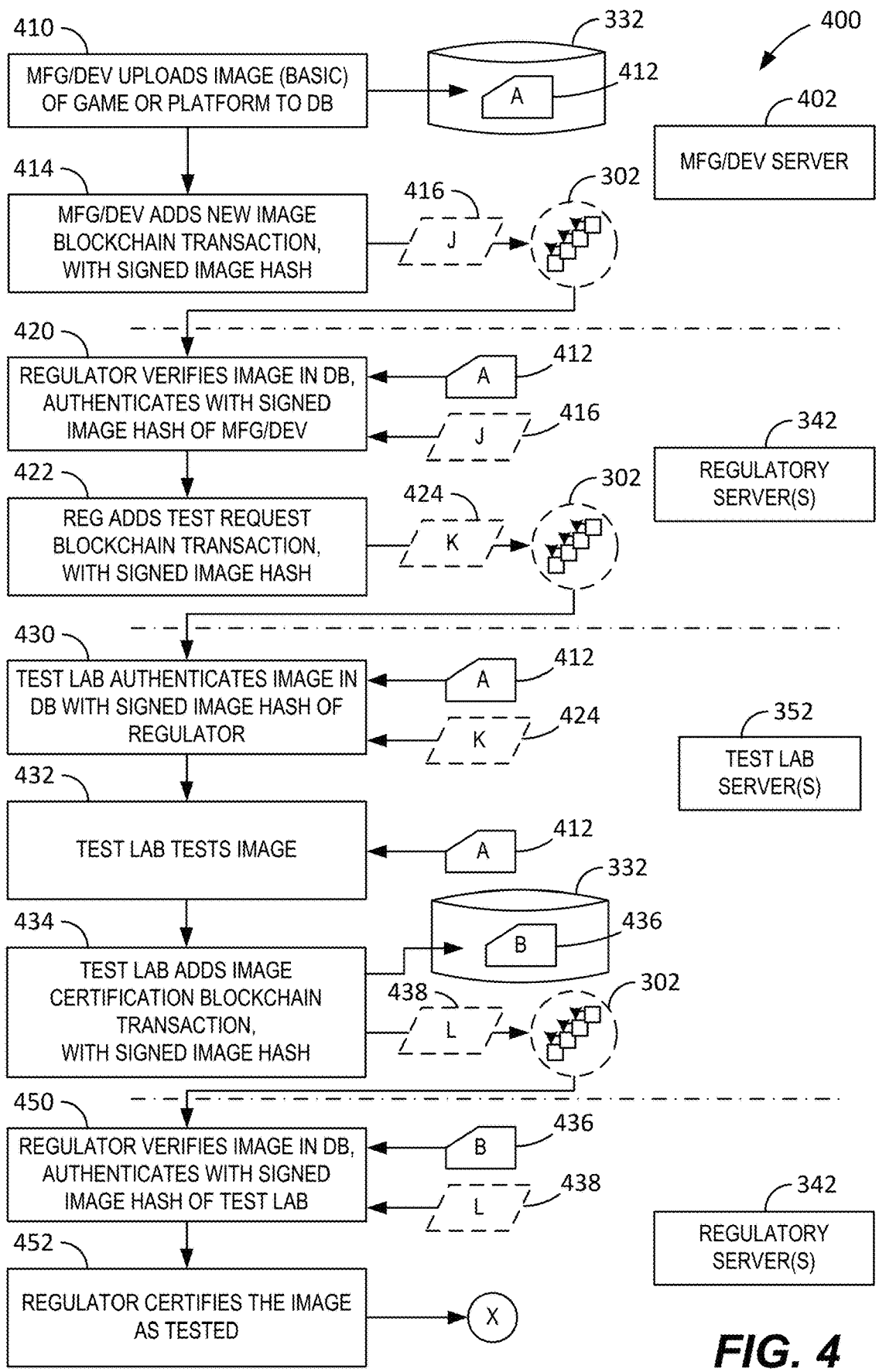
FIG. 4 is an example method illustrating a workflow for preparing a software image for installation in a regulated environment using blockchain technology.

FIG. 4 is an example method 400 illustrating a workflow for preparing a software image 412 for installation in a regulated environment using blockchain technology. In some embodiments, the method 400 may be practiced in the EGM distribution system 300 shown in FIG. 3, in which various devices participate in the blockchain 302. More specifically, in the example embodiment, the blockchain 302 is used as flow control between an EGM manufacturer or software developer (e.g., a group that presents software for regulatory approval and future installation on electronic gaming devices 104, 200, here represented as MFG/DEV server 402), a regulatory party (e.g., a jurisdictional entity overseeing electronic gaming, here represented as the regulatory server 342), and a test lab (e.g., an entity tasked with testing software for regulatory compliance, here represented as the test lab server 352), to certify a software image 412 (e.g., operating system images, platform images, blockchain client images, game images, components thereof, or the like) as a golden image. The servers 402, 342, 352 each participate in the blockchain 302 and have access to the golden image database 332. Blockchain transactions and the blockchain 302 itself are represented in FIGS. 4-7 in broken line, and dash-dot line is used to illustrate separation of party operations. While the servers 402, 342, 352 are described in the example embodiment as support server systems, such as the server computers 102, it should be understood that any of the participating parties may use alternate computing hardware in lieu of their respective servers 402, 342, 352. For example, laptops, personal computers, mobile computing devices, personal mobile computing devices, or other such computing hardware sufficient to perform the systems and methods described herein may be used.

In the example embodiment, at operation 410, the MFG/DEV server 402 submits a software image 412 for certification by uploading an image of the software image 412 to the golden image database 332. At this stage, the software image 412 is in an uncertified state (e.g., as the package 412 has not yet been tested and certified for use) and, as such, the software image 412 is not yet allowed to be downloaded and used on electronic gaming devices 104, 200 (e.g., via controls built into this system to accommodate regulatory control). As such, the software image 412 is illustrated and referred to herein as uncertified software package "A" 412. At operation 414, the MFG/DEV server 402 creates and adds a new image blockchain transaction 416 ("J") to the blockchain 302. The new image blockchain transaction 416 includes identification of the software image 412 within the database 332 (e.g., by assigned unique software package ID, "software UID," or the like) and an image hash of the software image 412 digitally signed by the submitter, and may include additional information such as, for example, a unique ID of the submitter (e.g., the manufacturer or developer), one or more unique IDs of regulatory bodies ("regulator UID," e.g., in a blockchain hosting participation by multiple regulatory bodies, each regulatory body with a vested interest in approving software may be identified), software version information, public key data (e.g., of the manufacturer, developer), or the like. Submission of the new image blockchain transaction 416, in the example embodiment, serves as a request to the regulatory body for testing and regulatory approval of the software image 412. While not separately illustrated, it should be understood that blockchain transactions described as being added to the blockchain 302 represent transmission of the blockchain transaction to other participating nodes in the blockchain network for the blockchain 302 for addition to a future block (e.g., by a miner node or other blocking node).

In the example embodiment, the regulatory server 342 receives updates to the blockchain 302 (e.g., as new blocks are added to the blockchain 302). The regulatory server 342 scans new blocks in the blockchain 302 for new image blockchain transactions 416 that have not yet been processed (e.g., for blockchain transactions having a particular transaction type associated with new image submissions). The regulatory server 342 may identify such transactions 416 based on their own regulatory ID. When the regulatory server 342 identifies the new image blockchain transaction 416, the regulatory server 342 confirms the existence of the software image 412 in the database 332 and verifies that the image in the database 332 is authentic at operation 420. More specifically, the regulatory server 342 decrypts the image hash from the new image blockchain transaction 416 (e.g., with the public key of the MFG/DEV), hashes the software image 412 from the database, and compares the two hashes to authenticate the submitter and the software image 412. At operation 422, the regulatory server 342 creates and adds a test request blockchain transaction 424 ("K") to the blockchain. The test request blockchain transaction 424 includes the software package ID of the software image 412 within the database 332 and an image hash of the software image 412 digitally signed by the regulator. The test request blockchain transaction 424 may also include additional information such as, for example, a unique ID of the submitting regulatory body, a unique ID of the test lab to which testing of this software image 412 is assigned ("test lab UID"), software version information, test request information, or the like. Submission of the test request blockchain transaction 424, in the example embodiment, serves as a request to the test lab for compliance testing and analysis of the software image 412. Participation by the regulatory body in the blockchain 302 and supporting database 332 allows the regulator to control aspects software submission, testing, and installation, including the technical certification of software prior to deployment on gaming devices 200, allowing the regulator to, for example, receive new software submissions, automate submission and verification of software compliance testing, control software distribution and installation, and maintain golden images for installed software verification. In other embodiments, the pre-testing regulatory steps of operations 420 and 422 may be absent at this stage and the testing of operation 430 and on may be triggered based on the new image blockchain transaction added at operation 414 (e.g., based on signed image hash from the manufacturer/developer).

In the example embodiment, the test lab server 352 similarly receives updates to the blockchain 302 and scans new blocks in the blockchain 302 for test request blockchain transactions 424 that have not yet been processed. The test lab server 352 may identify such transactions 424 based on their own test lab ID. When the test lab server 352 identifies the test request blockchain transaction 424, the test lab server 352 confirms the existence of the software image 412 in the database 332 and verifies that the image in the database 332 is authentic at operation 430. More specifically, the test lab server 352 decrypts the image hash from the test request blockchain transaction 424 (e.g., with the public key of the regulator), hashes the software image 412 from the database, and compares the two hashes to authenticate the regulator and the software image 412. At operation 432, the test lab performs testing of the software image 412 (e.g., verifying that the software image 412 is in compliance with local laws, statutes, regulations, and the like). At operation 434, the test lab server 352 creates and adds an image certification blockchain transaction 438 "L" to the blockchain 302. The image certification blockchain transaction 438 includes the software package ID of the software image 412 within the database 332 and an image hash of the software image 412 digitally signed by the test lab. The image certification blockchain transaction 438 may also include additional information such as, for example, a unique ID of the submitting regulatory body, a unique ID of the test lab that performed the testing, test certification information, version information for the tested software, testing type (e.g., regression, functional), or the like. Submission of the image certification blockchain transaction 438, in the example embodiment, serves as a response from the test lab to the submitting regulator, and may additionally or alternatively serve as a certification to other nodes in the blockchain 302 that the software image 412 is compliant (e.g., as far as the testing that the test lab is tasked to perform). Participation by the test lab in the blockchain 302 and supporting database 332 allows the test lab to receive and respond to requests for software testing, including the technical certification of software prior to deployment on gaming devices 200. Further, the described blockchain systems and methods described herein help preserve the integrity and chain of trust between the parties and replaces physically mailed copies of software in a centralized repository while providing a work flow and verification method supported by the blockchain, with the regulator acting as the approver and verifier of the software deployments without having to rely on physical courier intermediaries.

In some embodiments, the test lab server 352 (or the regulatory server 342) may certify the software image 412 in the database 332 as having been tested compliant, thus making the software image 412 available for installation. In the example embodiment, the test lab server 352 stores a certified software image 436 "B" in the golden image database 332 (e.g., a copy of the software image 412). As such, the certified software image 436 is subsequently available for software installation. In some embodiments, the test lab server 352 may append nonce data (e.g., a predetermined number of bytes of impotent data or instructions added to the end of the image 412 that does not effectively change the operation of the software image 436) to the software image 412 when generating the certified software image 436, thereby causing hashes of the certified software image 436 to differ from hashes of the originally submitted software image 412. As such, the signed image hash included in the image certification blockchain transaction 438 is the hash of the modified software image. In other embodiments, a certification file related to the certification process performed on the software image 436 may be generated (e.g., at the conclusion of the certification process) and the test lab server 352 may hash the certified software image 412 together with a digital copy of the certification file to generate a certified image hash, thereby causing hashes of the certified image hash to differ from the image hash of the software image 412 alone. Such an embodiment provides a different hash while avoiding modification of the certified image, and thus may be more favourable to manufacturers and regulators.

In the example embodiment, the regulatory server 342 similarly scans new blocks in the blockchain 302 for image certification blockchain transactions 438 that are associated with their pending testing requests. When the regulatory server 342 identifies the image certification blockchain transaction 438, the regulatory server 342 confirms the existence of the certified software image 436 in the database 332 and verifies that the image in the database 332 is authentic at operation 450. More specifically, the regulatory server 342 decrypts the image hash from the image certification blockchain transaction 438 (e.g., with the public key of the test lab), hashes the certified software image 436 from the database 332, and compares the two hashes to authenticate the test lab and the certified software image 436. In embodiments where nonce data was added to the certified software image 436, the regulatory server 342 may additionally verify authenticity of the certified software image 436 by truncating the predetermined number of bytes from the certified software image 436, hash the truncated image, and compare that truncated image hash to a hash of the original software image 412 (e.g., to ensure that the original software image 412 remains in the certified software image 436). Accordingly, at operation 452, the regulator approves the certified software image 436 (e.g., in the database 332) as tested and ready for production use. In some embodiments, the regulator may send an approval communication (e.g., letter, email) to the manufacturer or software developer providing the results of the testing and certification process (e.g., approved, rejected, revoked, withdrawn, and such), along with the image hash of the certified software image 436, which may subsequently be used in the field (e.g., to verify installed copies).

Figure 5:
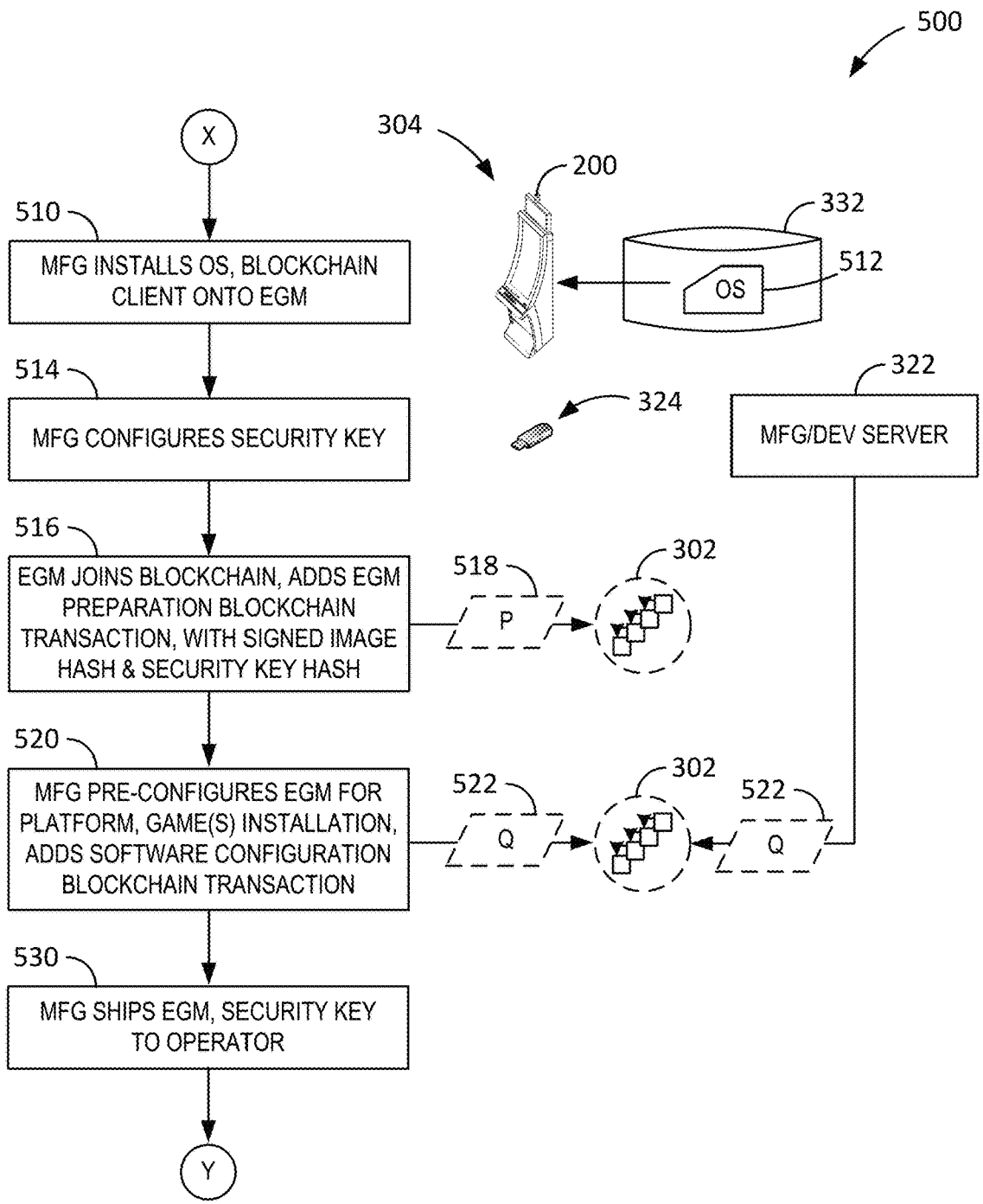
FIG. 5 is an example method for preparing an EGM, such as the EGM, for shipment using blockchain technology.

FIG. 5 is an example method 500 for preparing an EGM, such as the EGM 200, for shipment using blockchain technology. In some embodiments, the method 500 may be practiced in the EGM distribution system 300 shown in FIG. 3, in which various devices participate in the blockchain 302. More specifically, in the example embodiment, the blockchain 302 is used to manage aspects of device preparation (e.g., prior to shipment) and software installation and certification (e.g., after arrival) on the gaming device 200. Some operations of method 500 may be performed or orchestrated using the MFG/DEV server 322.

In conventional EGM preparation processes, software installation on the EGM is not performed prior to shipment, but is instead performed once the EGM has been shipped and arrived at its destination. Such prior processes were developed in an effort to mitigate some security risks, such as tampering with the EGM during shipment or gambling use of the EGM prior to arrival at the operation venue and authorization by the regulator. Some conventional processes may include separately shipping operating system ("OS") media, platform media, game media, or other software, or separately shipping storage device(s) (e.g., solid state drives, CFast card with such software already installed) that is to get installed on the EGM after arrival.

Here, the method 500 represents a process that provides security features that allows at least some software to be installed prior to shipment while providing detection and prevention for certain security exposures. More specifically, at operation 510, in the example embodiment, the manufacturer installs an operating system ("OS") image 512 and a blockchain client (not separately shown in FIG. 5) onto the EGM 200 (e.g., onto the storage device 310 shown in FIG. 3) while the EGM 200 is at the device preparation venue 304. In some embodiments, the OS image 512 and the blockchain client may be installed onto the storage device 310 by another computing device (e.g., an installation preparation computer, not shown, temporarily mounting the storage device 310 before moving the storage device 310 into the EGM 200). The OS image 512 and blockchain client may be similar to the operating system 312 and blockchain client 314 as shown and described in FIG. 3. In some embodiments, the OS image 512 and blockchain client are software images 412 uploaded, tested, and certified using the method 400 shown and described in FIG. 4. The OS image 512 and the blockchain client are golden images of the operating system 312, a tested and certified OS image downloaded from the golden image database 332. In some embodiments, the blockchain client may be included within the OS image 512.

In the example embodiment, at operation 514, the manufacturer configures the security key 324 (e.g., as shown and described in relation to FIG. 3). At operation 516, the EGM 200 is network connected (e.g., to the blockchain network of other nodes participating in the blockchain 302) and joins the blockchain 302, establishing its own identity on the blockchain (e.g., generating a public/private key pair for the EGM 200). More specifically, the EGM 200 acquires and stores a current copy of the existing blockchain 302 (e.g., on the storage device 310). In addition, the EGM 200 adds an EGM preparation blockchain transaction 518 "P" to the blockchain 302. The EGM preparation blockchain transaction 518 includes the machine UID of the EGM 200 and a signed security key hash used as at least one factor of authentication before placing the EGM 200 into operation. In some embodiments, the public key of the manufacturer or developer may be included in the security key 324 or within the blockchain 302. In some embodiments, a security key 324 may be provided for each EGM 200 and the security key 324 may include the machine UID, the customer ID, and a hash of the game image approved for installation, and a hash of the game image hash combined with any other information on the security key (e.g., machine UID). In some embodiments, the data on the security key 324 may be compared and used to cross-validate information on the blockchain 302. For example, a smart contract may check to ensure that there is a corresponding security key 324 in the EGM 200 before installing the game image. In some embodiments, the EGM preparation blockchain transaction 518 may also include device make/model information, a public key of the EGM 200 manufacturer or game developer, an operator ID of the purchaser of the EGM 200, a signed image hash or other software information of the OS image 512 that was installed on the EGM 200, initial installation or shipping timestamps, market information, jurisdiction settings, or other configuration information associated with the EGM 200. The EGM preparation blockchain transaction 518, in the example embodiment, serves to memorialize the initial configuration and deployment of the EGM 200, thereby, for example, allowing other interested parties (e.g., regulators, the purchasing operator) to view status, initial configuration settings, verify software installation, authenticate the manufacturer, or other information about the EGM stored in the blockchain 302.

In some embodiments, other software components (e.g., game platforms, particular electronic games) are installed prior to shipment. In the example embodiment, some software components are pre-configured within the blockchain 302 to be installed on the EGM 200 after shipping (e.g., once the EGM 200 arrives at the intended destination, the operational venue). More specifically, and for example, the manufacturer may prepare a particular electronic game to be provided by the EGM 200 (e.g., based on operator order). As such, the manufacturer may create and add a software configuration blockchain transaction 522 "Q" to the blockchain 302 (e.g., submitted via the EGM 200 or via the MFG/DEV server 322). In the example embodiment, the software configuration blockchain transaction 522 includes the machine UID of the EGM 200 and the software UID of software image(s) to be installed on the EGM 200. The software configuration blockchain transaction 522 may also include the operator UID, order information, software configuration settings, or the like. While, in the example embodiment, game platform and game software is not installed on the EGM 200 until after the EGM 200 has been delivered to the operational venue, the software configuration blockchain transaction 522 serves to pre-stage software that is eligible to be loaded onto the EGM 200 upon arrival.

At operation 530, in the example embodiment, the manufacturer disconnects the EGM from the blockchain 302 and packages and ships the EGM 200 to the operational venue. Further, the manufacturer separately ships the security key 324 to the operator. In embodiments using the security key 324, separate shipment of the security key 324 from the EGM 200 protects aspects of tampering that could occur during shipment.

Figure 6:
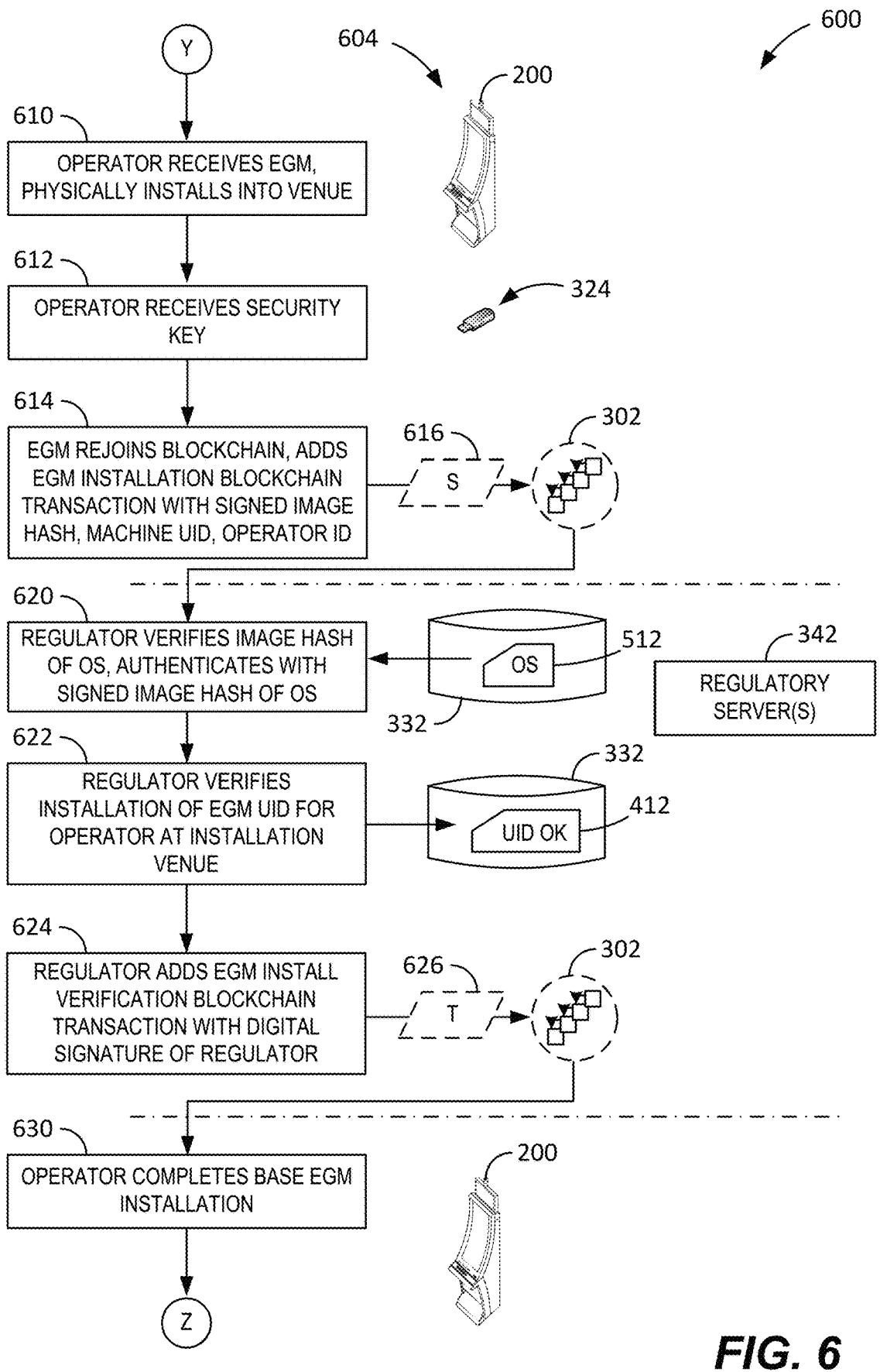
FIG. 6 is an example method for installing the EGM at the operational venue using the blockchain.

FIG. 6 is an example method 600 for installing the EGM 200 at the operational venue using the blockchain 302. In some embodiments, the method 600 may be practiced in the EGM distribution system 300 shown in FIG. 3, in which various devices participate in the blockchain 302. More specifically, in the example embodiment, the blockchain 302 is used to manage aspects of device installation and certification upon arrival and installation at the operational venue. At operation 610, the operator receives the EGM 200 (e.g., from a freight carrier) and physically installs the EGM 200 into the operational venue (e.g., powering up the EGM 200, network connecting the EGM 200, and the like). At operation 612, the operator receives the security key 324 (e.g., via postal mail or the like). The operator or designated representative (e.g., a service technician) may install the security key 324 to continue logical installation of the EGM 200 (e.g., into a USB port within the EGM 200).

At operation 614, in the example embodiment, the EGM 200 reestablishes networked communication with the blockchain network and rejoins the blockchain 302. As such, the local copy of the blockchain 302 on the EGM 200 may be updated with any changes that have occurred to the blockchain 302 while the EGM 200 was disconnected. Further, upon reconnection, the EGM 200 also configured to add an EGM installation blockchain transaction 616 "S" to the blockchain 302. The EGM installation blockchain transaction 616 includes a signed image hash of the OS image 512 installed on the EGM 200, the machine UID of the EGM 200, and may include other information such as the operator UID, a venue UID of the operational venue, the regulator UID, software UIDs of software images (e.g., OS image 512) already installed on the EGM 200, a timestamp of the installation, any of the data from the security key 324, or the like. The EGM installation blockchain transaction 616 serves to memorialize device installation of the EGM 200 at the operational venue and to initiate an installation verification process with the regulators. In some embodiments, the EGM 200 may cross-validate data on the security key 324 relative to information memorialized to the blockchain 302 during the initial installation, such as the image hash of the installed software, the machine UID, the digital signatures, or the like.

At operation 620, in the example embodiment, the regulatory server 342 scans new blocks in the blockchain 302 for EGM installation blockchain transactions 616. When the regulatory server 342 identifies the EGM installation blockchain transactions 616, the regulatory server 342 verifies the signed image hash of the OS image 512 and authenticates the manufacturer. At operation 622, the regulatory server 342 also verifies that the EGM 200 is approved for installation at the operational venue. In some embodiments, the operator may provide a digital signature to the regulatory server 342 (e.g., in the EGM installation blockchain transaction 616, provided by the service technician during installation), thereby allowing the regulatory server 342 to verify association with the operator and the operational venue. At operation 624, the regulatory server 342 adds an EGM install verification blockchain transaction 626 "T" to the blockchain 302. The EGM install verification blockchain transaction 626 includes a digital signature of the regulator and includes the machine UID of the EGM 200, and may include a timestamp of the install verification, and any of the data provided in the EGM installation blockchain transaction. At operation 630, the EGM 200 scans and identifies the EGM install verification blockchain transaction 626 in the blockchain 302 and proceeds with software installation.

In situations where the method 600 fails, such as, for example, if the regulatory server 342 rejects the image hash at operation 622, if the EGM 200 fails to rejoin the blockchain 302 at operation 614, or if cross-validation of blockchain data and the data stored on the security key 324 fails, then the process may include reverting to an installation and authentication process outside of the blockchain workflow shown here (e.g., shipping and manual installation of certified software from media).

In some embodiments, the blockchain 302 may include a smart contract configured to perform aspects of the method 600 for download or installing one or more software packages (e.g., platform software 316 or game software 318) on the EGM 200. For example, the regulatory server 342 may add a regulated installation approval blockchain transaction (not shown) into the blockchain 302 (e.g., prior to arrival of the EGM 200 at the operational venue). At operation 614, when the EGM 200 adds the EGM installation blockchain transaction 616 to the blockchain 302, the smart contract may be configured to search for a matching regulated installation approval blockchain transaction, perhaps matching on the machine UID and the operator UID. If a regulated installation approval blockchain transaction is found in the blockchain 302 that matches the machine UID and operator UID, the smart contract may automatically add the EGM install verification blockchain transaction 626, thereby authorizing the installation of the EGM 200 at the operational venue and skipping portions of operations 620-624. In some embodiments, the smart contract may also be configured to verify the signed image hash from the EGM installation blockchain transaction 616 (e.g., based on an image hash for the OS image 512 provided in the regulated installation approval blockchain transaction). In some embodiments, the smart contract may be configured to determine whether conditions have been satisfied prior to allowing downloading of software to the EGM 200.

Figure 7:
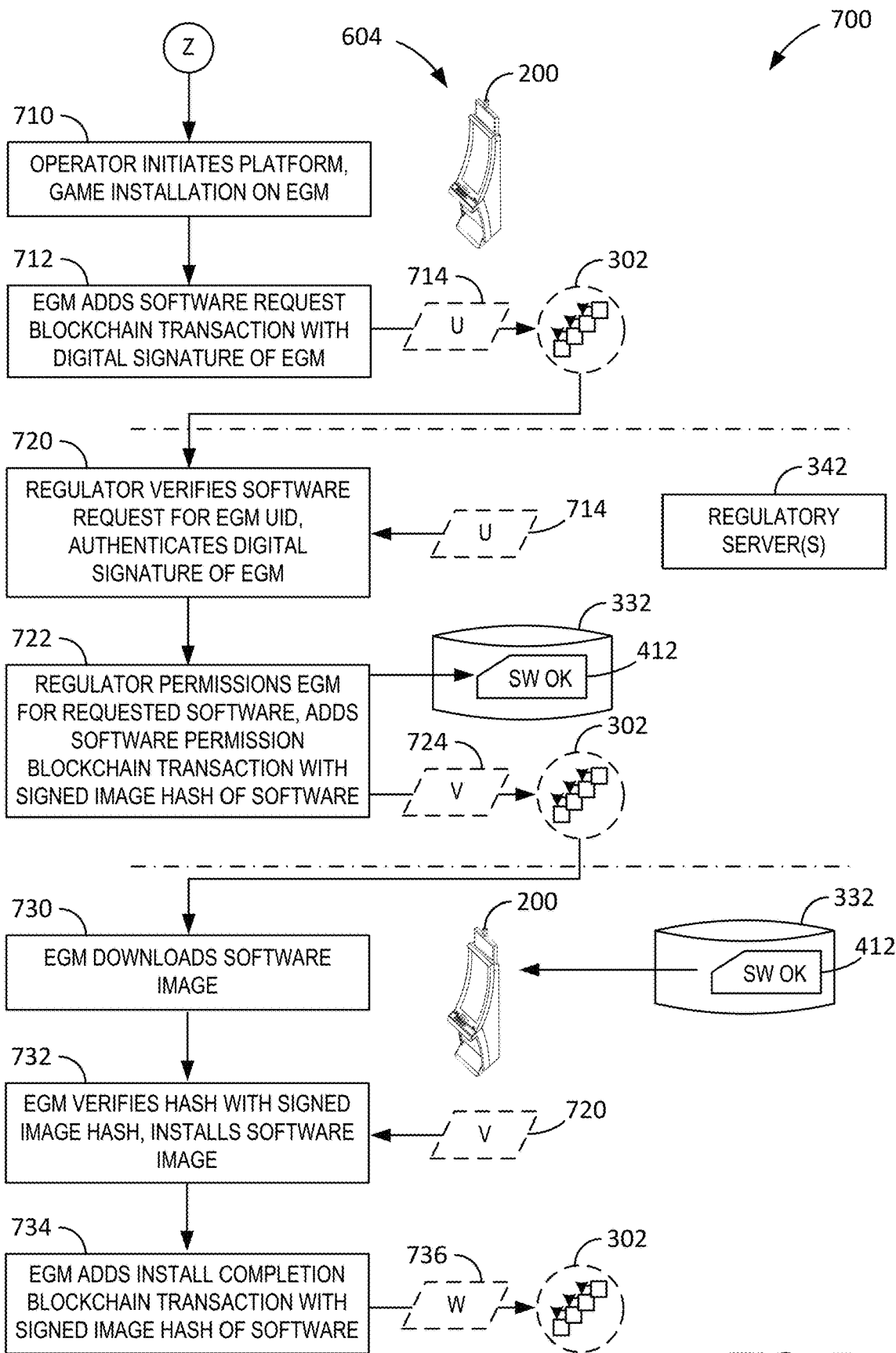
FIG. 7 is an example method for installing software components the EGM at the operational venue using the blockchain.

FIG. 7 is an example method 700 for installing software components on the EGM 200 at the operational venue using the blockchain 302. In some embodiments, the method 600 may be practiced in the EGM distribution system 300 shown in FIG. 3, in which various devices participate in the blockchain 302. More specifically, in the example embodiment, the blockchain 302 is used to manage aspects of software installation (e.g., platform software 316, game software 318, or the like) upon arrival and installation at the operational venue. At operation 710, the operator or service technician initiates installation of a software component 334 (e.g., a software image 412 from the golden image database 332). In some embodiments, the software installation at operation 710 may be automatically initiated by the EGM 200 (e.g., upon initial arrival at the operational venue). In the example embodiment, the EGM 200 adds a software request blockchain transaction 714 "U" to the blockchain 302 at operation 712. The software request blockchain transaction 714 includes one or more software UIDs for one or more software images 412 from the golden image database 332, the machine UID of the EGM 200, and a digital signature of the EGM 200.

At operation 720, in the example embodiment, the regulatory server 342 scans new blocks in the blockchain 302 and identifies the software request blockchain transaction 714. In some embodiments, the regulatory server 342 performing these operations may be a server of a manufacturer, a casino operator, or any third-party server containing regulatory agency approved installation software (e.g., the game image is approved by the regulatory agency and then transferred to the casino server for download and install onto the EGM 200). The regulatory server 342 verifies that the software request blockchain transaction 714 is from the EGM 200 (e.g., based on the digital signature) and that the requested software UIDs (e.g., the associated software images 412) are certified for installation and are approved for the EGM 200 (e.g., based on the machine UID). At operation 722, the regulatory server 342 permissions the EGM 200 for the requested software. More specifically, in some embodiments, the regulatory server 342 may record permission for the EGM 200 to access a software image 412 from the golden images database 332. The regulatory server 342 may add a software permission blockchain transaction 724 "V" to the blockchain 302, including the machine UID and an authorization code encrypted with the public key of the EGM 200 (e.g., thereby allowing only the EGM 200 to access the code), and may include an image hash of the software image 412, software configuration settings, or the like. The software permission blockchain transaction 724 serves to memorialize the permissioning of the EGM 200 for access to the software image 718 and provide the authorization code to the EGM 200 (e.g., to facilitate download).

At operation 730, in the example embodiment, the EGM 200 scans and identifies the software permission blockchain transaction 724 from the blockchain 302 for the pending software request and extracts the authorization code (e.g., using the public key of the EGM 200). As such, the EGM 200 initiates a download of the software image 412 from the database 332, providing the authorization code to confirm identity and permission to initiate the download. After download is complete, at operation 732, the EGM 200 may verify the downloaded image 412 using the image hash provided in the software permission blockchain transaction 724, thereby verifying the integrity of the image 412. Once verified, the EGM installs the software image 412 on the EGM 200. At operation 734, the EGM 200 creates and adds a software installation completion blockchain transaction 736 "W" into the blockchain. The software installation completion blockchain transaction 736 includes the machine UID of the EGM 200, the software UID of the software image 412, and may include other information such as a timestamp of the download, a timestamp of the installation, initial configuration settings applied to the software, or the like.

In some embodiments, where software may have been pre-configured for this EGM 200 (e.g., by the manufacturer or software developer, as described in relation to FIG. 5), the software configuration blockchain transaction 552 may function in lieu of portions of the method 700. For example, addition of the software configuration blockchain transaction 552 may cause the regulatory server 342 to perform operations 720 and 722, thereby pre-staging permission for the EGM 200 to download certain software images 412. As such, after operation 712, the EGM 200 may immediately find the software permission blockchain transaction 724 in the blockchain 302.

In some embodiments, the blockchain 302 may include a smart contract configured to perform aspects of the method 700 for permissioning software installation for the EGM 200. For example, the regulatory server 342 may add a regulated software installation approval blockchain transaction (not shown) into the blockchain 302 (e.g., prior to arrival of the EGM 200 at the operational venue). At operation 614, when the EGM 200 adds the software request blockchain transaction 714 to the blockchain 302, the smart contract may be configured to search for a matching regulated software installation approval blockchain transaction, perhaps matching on the machine UID and software UID. If a regulated software installation approval blockchain transaction is found in the blockchain 302 that matches the machine UID and software UID, the smart contract may automatically add the software permission blockchain transaction 724 to the blockchain 302, thereby authorizing the software image 412 to be installed on the EGM 200, thereby skipping portions of operations 720, 722. In some embodiments, the smart contract may also be configured to verify the digital signature of the EGM 200.

In some embodiments, aspects of the method 700 may be used to perform upgrades of the EGM 200 after initial installation. For example, the EGM 200 may be reconfigured to provide a different game or a new version of the current game or underlying game platform may be released. As such, the operator, manufacturer, or technician may initiate a game install or upgrade at operation 710 for that other software package. The method 700 follows the same blockchain work flow, submitting the software request blockchain transaction at operation 712, performing the regulatory steps of operations 720, 722, and downloading and installing the new software package(s) at operations 730-734.

In some embodiments, the EGM 200 may, additionally or alternatively to the above described methods, provide a local blockchain (not separately depicted) used to facilitate some of the aspects of verification and validation of installed software described herein. For example, the EGM 200 may create a local blockchain similar to blockchain 302 but without other participating nodes. The EGM 200 may memorialize various data in the local blockchain and may use that local blockchain to validate installed software at later stages of installation. In one embodiment, the EGM 200 creates the local blockchain on the storage device 310, or on a dedicated partition in some embodiments, during installation (e.g., at operation 510). The EGM 200 may, additionally or alternatively, add the EGM preparation blockchain transaction of operation 516 to the local blockchain, thereby recording information such as the signed image hash of software images installed during pre-shipment configuration of the EGM 200, which may include any of the data stored on the security key 324. The local blockchain therefore contains a record of installation data that can be used, for example, to verify the integrity of the installed images upon initial installation and configuration at the operational venue.

During the installation process at the operational venue (e.g., method 600), the EGM 200 may, additionally or alternatively, verify the image hash of the installed software components using the signed image hash that was created and stored in the local blockchain prior to shipment (e.g., similar to operation 620). Further, the EGM 200 may memorialize a record of this installation verification on the local blockchain, thereby logging this step in the process locally. Such a successful check may be required to be completed prior to proceeding with operation 630.

Further, the local blockchain may, additionally or alternatively, record subsequent software installation events. For example, when a software installation process similar to method 700 is performed on the EGM 200, the EGM 200 may memorialize such an event in the local blockchain by entering an installation completion blockchain transaction into the local blockchain (e.g., similar to operation 734). Such information may be later used by the EGM 200 to perform integrity checks of the installed software by, for example, generating image hash(es) of the currently installed software components and comparing those image hash(es) to the signed image hashes stored in the local blockchain (e.g., to verify that the installed software has not changed, similar to operation 732). As such, the local blockchain provides an additional layer of verification and security to the installation process.

While many of the examples illustrated herein are described with respect to an electronic gaming device such as slot machines (e.g., electronic gaming devices 104 shown in FIG. 1) or bartop video machines (not separately shown), it should be understood that other gaming devices may be used with any or all of the described systems and methods described herein. In one embodiment, a consumer gaming device is provided (e.g., as the gaming device 200) that practices the described methods. The consumer gaming device may be configured for personal (e.g., home-based or mobile) use and may be packaged for retail sale (e.g., similar to a conventional Xbox® or Playstation®) and may include conventional hardware components of such devices (e.g., DVD-ROM drive, game controllers, network interface), any of the hardware components of gaming device 200, as well as any hardware sufficient to enable the systems and methods described herein. Further, the term "consumer" is used herein to refer to an end user (e.g., the player of the electronic games offered by the devices). While operators (e.g., casinos, gaming establishments) may be purchasers or leasers of gaming devices 104, 200, operators are distinguished from consumers as operators typically generate revenue or other business interest from the gaming devices 104, 200, where consumers derive enjoyment and entertainment from play of such devices.

In one consumer device embodiment, the consumer gaming device may be prepared with the operating system 312 and possibly the blockchain client 302, platform software 316, and game software 318 prior to shipment (e.g., prior to shipment to suppliers, merchants, or consumers) as shown and described by method 500 of FIG. 5, and may optionally include the security key 324. The preparation may include a device preparation blockchain transaction similar to the EGM preparation blockchain transaction described above (e.g., providing a signed image hash of any of the components of the originally-installed software components).

Upon purchase by the consumer, the consumer gaming device may perform aspects of the post-shipment methods 600, 700 of FIG. 6 and FIG. 7. For example, the consumer may install the gaming device (e.g., at their home) or otherwise initialize the consumer gaming device for operation (e.g., as a mobile device) by, for example, connecting the consumer gaming device to a network (e.g., the Internet, a local area network, a Wi-Fi network, a cellular network, or the like) that allows the consumer gaming device to join or rejoin the blockchain network. Once established in the blockchain network, the integrity of the already-installed software components may be similarly verified (e.g., operations 614-630). Further, the blockchain may be pre-configured with a software configuration blockchain transaction that identifies software for installation on the consumer gaming device. That software may be consumer-initiated or automatically downloaded from the golden images database 332 with the software request transaction (e.g., operations 710-734). As such, the regulatory approval and integrity checks of the systems and methods described herein may be provided for consumer gaming devices.

Accordingly, this system and methods facilitate use of blockchain and smart contracts to authenticate and permission software downloads of certified authentic copies of software components to EGMs during installation. In some embodiments, software upgrades may similarly be submitted with preparation, component verification, installation approval, and download approval transactions through the blockchain and associated smart contracts. As such, device security can be improved and time to installation can be reduced.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A blockchain system for facilitating preparation and installation of electronic gaming devices using a blockchain network, the blockchain system comprising an electronic gaming machine (EGM) configured to participate in the blockchain network, the electronic gaming machine comprising:
    a memory storing an operating system (OS), a blockchain client, a blockchain and a machine unique identifier (UID) of the EGM;

a network interface configured to allow networked communication between the EGM and other participating nodes in the blockchain network; and at least one processor configured to execute instructions which, when executed, cause the at least one processor to:

execute the operating system and the blockchain client, the blockchain client participating in the blockchain network with the other participating nodes, the other participating nodes including a cloud server of a regulated cloud storing certified software images of software components for EGMs in the blockchain network;

initiate a software installation on the EGM of a software component after the EGM has been delivered to an operational venue, the initiation including transmitting a software request transaction into the blockchain network for addition to the blockchain;

identify a software permission blockchain transaction from the blockchain, the software permission blockchain transaction authorizing installation of the software component on the EGM;

download the software component from a cloud server of a regulated cloud storing certified software images of software components for EGMs in the blockchain network; and install the software component on the EGM.

2. The blockchain system of claim 1, wherein the at least one processor is further configured to:

execute the operating system and the blockchain client prior to shipment of the EGM to the operational venue; and transmit an EGM preparation blockchain transaction into the blockchain network for addition to the blockchain prior to shipment of the EGM to the operational venue, the EGM preparation blockchain transaction including the machine UID.

3. The blockchain system of claim 2, wherein the instructions further cause the at least one processor to:

generate an initial image hash of one or more of the operating system and the blockchain client as installed on the memory and prior to shipment of the EGM to the operational venue, wherein the EGM preparation blockchain transaction further includes the initial image hash.

4. The blockchain system of claim 3, wherein the instructions further cause the at least one processor to digitally sign the initial image hash using a private key of a public-key cryptography key pair prior to inclusion of the initial image hash into the EGM preparation blockchain transaction.

5. The blockchain system of claim 3, wherein the instructions further cause the at least one processor to rejoin the blockchain after the EGM has been delivered to the operational venue.

6. The blockchain system of claim 5, wherein the instructions further cause the at least one processor to:

search the blockchain for the initial image hash;

generate a current image hash of the one or more of the operating system and the blockchain client as installed on the memory after shipment of the EGM to the operational venue; and perform an integrity check of the EGM by comparing the initial image hash to the current image hash.

7. The blockchain system of claim 6, wherein the instructions further cause the at least one processor to:

generate a current image hash of the one or more of the operating system and the blockchain client as installed on the memory after shipment of the EGM to the operational venue; and transmit an EGM installation blockchain transaction into the blockchain network for addition to the blockchain after arrival of the EGM at the operational venue, the EGM installation blockchain transaction including the current image hash.

8. The blockchain system of claim 7, wherein the instructions further cause the at least one processor to:

search the blockchain for an EGM install verification blockchain transaction identifying the EGM, the EGM install verification blockchain transaction representing regulatory certification that the current image hash is verified as authentic by a regulatory body; and confirm authenticity of the current image hash during an initial installation of the EGM at the operational venue based on the EGM install verification blockchain transaction, wherein the EGM install verification blockchain transaction includes a digital signature of the regulatory body.

9. The blockchain system of claim 2, wherein executing the operating system and the blockchain client prior to shipment includes the blockchain client joining the blockchain prior to shipment of the EGM to the operational venue.

10. The blockchain system of claim 1, wherein the instructions further cause the at least one processor to transmit a software configuration blockchain transaction into the blockchain network for addition to the blockchain prior to shipment of the EGM to the operational venue, the software configuration blockchain transaction including at least one software ID identifying a software package to be installed on the EGM after shipment of the EGM to the operational venue.

11. The blockchain system of claim 10, wherein the instructions further cause the at least one processor to:

search the blockchain for the software configuration blockchain transaction; and identify the software component from the software configuration blockchain transaction, wherein initiating a software installation on the EGM includes initiating a software installation for the software component based on the software component identified in the software configuration blockchain transaction.

12. The blockchain system of claim 1, wherein the EGM has a public/private key pair specific to the EGM and used to digitally sign at least some data stored in the blockchain.

13. The blockchain system of claim 1, wherein a manufacturer of the EGM has a public/private key pair specific to an operator and used to digitally sign at least some data stored in the blockchain.

14. The blockchain system of claim 1, wherein the software request transaction identifies the software component, wherein the software request transaction includes a digital signature of the EGM.

15. The blockchain system of claim 1, wherein the instructions further cause the processor to:

create a local blockchain in the memory and local only to the EGM;

generate an initial image hash of one or more of the operating system and the blockchain client as installed on the memory and prior to shipment of the EGM to the operational venue; and add a local EGM preparation blockchain transaction to the local blockchain, the local EGM preparation blockchain transaction includes the initial image hash.

16. The blockchain system of claim 15, wherein the instructions further cause the processor to:
search the local blockchain for the initial image hash;
generate a current image hash of the one or more of the operating system and the blockchain client as installed on the memory after shipment of the EGM to the operational venue; and
perform an integrity check of the EGM by comparing the initial image hash to the current image hash.

17. The blockchain system of claim 1 further comprising a developer server that participates as a node in the blockchain, the developer server is configured to:
upload an uncertified image of the software component to the cloud server for regulatory approval prior to installation on the EGM, the uncertified image of the software component being initially in an uncertified state; and
transmit a new image blockchain transaction into the blockchain network for addition to the blockchain, the new image blockchain transaction including an identifier of the uncertified image and an image hash of the uncertified image digitally signed by a manufacturer.

18. The blockchain system of claim 17 further comprising a testing server that participates as a node in the blockchain, the testing server is configured to:
initiate a test of the software component based on the new image blockchain transaction; and
transmit an image certification blockchain transaction into the blockchain network for addition to the blockchain, the image certification blockchain transaction including a certified image hash of the software component digitally signed by the testing server with a digital signature when the test of the software component is successfully completed.

19. The blockchain system of claim 18 further comprising a regulatory server that participates as a node in the blockchain, the regulatory server is configured to:
identify the image certification blockchain transaction in the blockchain;
authenticate the test of the software component based on the digital signature of the testing server;
compare the certified image hash to an image hash of the software component from the cloud server to determine that the software component on the cloud server is identical to the software component; and
certify the software component for deployment.

20. The blockchain system of claim 19, wherein the cloud server stores a repository of certified software components for installation to regulated gaming machines, wherein download of the software component from the cloud server is restricted until the regulatory server certifies the software component for deployment.

* * * * *